(No Model.)
D. H. ISEMINGER.
TRY SQUARE.
No. 413,946. Patented Oct. 29, 1889.
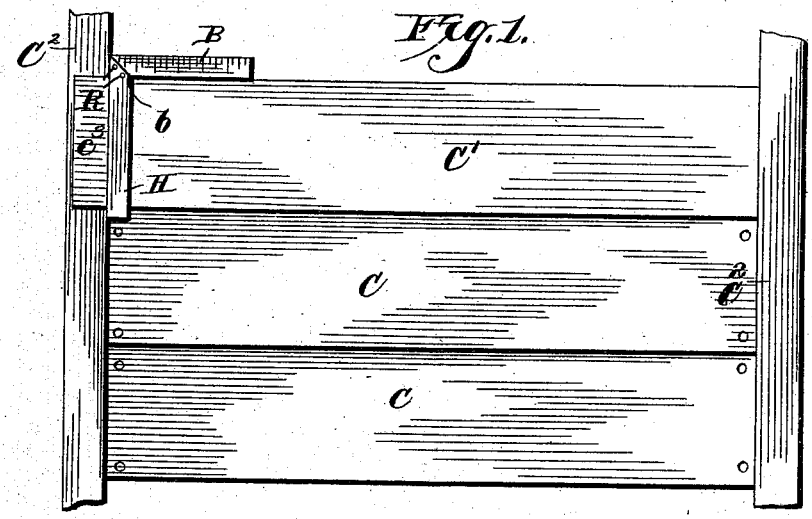
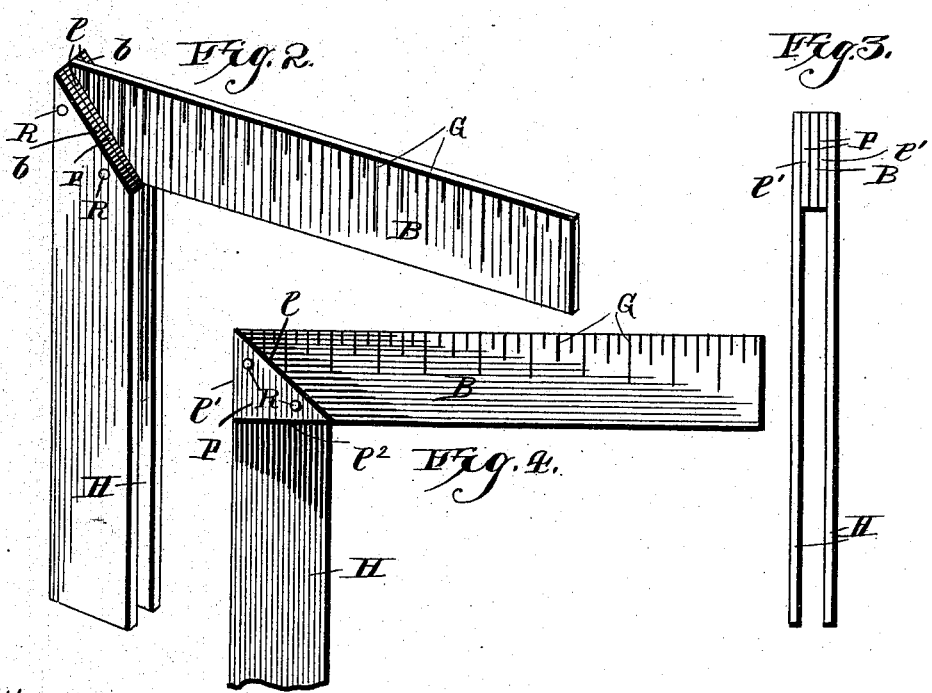
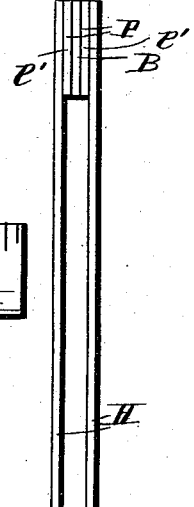
Witnesses:
Henry G. Dieterich
H. F. Riley
Inventor:
Daniel H. Iseminger
By his Attorneys,

UNITED STATES PATENT OFFICE.

DANIEL HENRY ISEMINGER, OF BLOOMINGTON, ILLINOIS.

TRY-SQUARE.

SPECIFICATION forming part of Letters Patent No. 413,946, dated October 29, 1889.

Application filed May 22, 1889. Serial No. 311,666. (No model.)

*To all whom it may concern:*

Be it known that I, DANIEL HENRY ISEMINGER, a citizen of the United States, residing at Bloomington, in the county of McLean and State of Illinois, have invented a new and useful Try-Square, of which the following is a specification.

This invention relates to improvements in try-squares; and it consists of a longitudinally-slotted handle having one end beveled, a blade entering said beveled end, triangular pieces between the blades and the sides of the handle, and rivets rigidly securing said parts together, all constructed and adapted for use as hereinafter fully described.

In the accompanying drawings, forming a part of this specification, and wherein the same letters of reference are applied to corresponding parts, Figure 1 is a side elevation of my try-square, illustrating it as used in connection with clapboards. Fig. 2 is a perspective view of the try-square. Fig. 3 is a rear elevation of the handle, and Fig. 4 is a side view with one side of the handle removed.

The letter H designates the handle of my improved try-square, which handle is composed of two independent members, beveled, as at $b$, at their upper ends.

P designates two similar pieces, preferably of the shape of a right-angle triangle, one side $p'$ whereof stands flush with the vertical rear edge of the handle, the other side $p^2$ whereof stands at right angles across said handle, and the beveled face $p$ whereof lies flush with the bevel $b$ of the handle, all as clearly shown in the drawings.

B designates the blade, which is preferably scored or provided with graduation-marks G along its outer edge. At its ends the blade B is cut squarely off, and its inner end lies between the inner faces of the pieces P and stands flush with the rear edge of the handle.

The above parts are preferably of metal, of suitable thickness, breadth, and length to meet all requirements. The parts being assembled as described, two or more rivets R are passed through them all at their meeting ends, and the try-square is ready for use.

C designates clapboards in the act of being applied to the side of a building. In such application the lowermost are supposed to be already nailed or secured in place, and the uppermost C' is just brought in position, and it is desired to cut the board C' the same length as the other clap. The handle of the square is then placed thereover, its members straddling the upper board and being a little longer than the width of the same. When said upper board is pressed downwardly to the proper position, so that it will lap the next beneath to the desired degree, its lower outer corner strikes the inner face of the outer member of the handle, and it is supported thereby, the upper inner cover of the board next beneath abutting against the inner face of the inner member of the handle, as will be clearly understood. The square is adjusted along the board C' until the inner member of the handle lies along the framework $C^2$ and the outer member of the handle lies across the front face of the board C', which is then marked off, and the end $c^3$ can be immediately cut off, leaving the board C' the proper length. By this construction of the try-square the board is marked and squared at the same time, which is a great advantage. The use of the beveled faces $b$ and $p$ is obviously to adapt the square for use as a miter or bevel square, and these faces may be made at any angle, preferably forty-five degrees.

The device is neat, serviceable, and strong, and it combines a ruler, measure, square, bevel, and siding support all in one.

What I claim is—

1. A try-square comprising a blade B, a handle H, composed of two members, one on either side of the blade, pieces P between the ends of said members and of the blades, the ends $b$ of said members and one side $p$ of said pieces being beveled, as shown, for the purpose set forth.

2. A try-square comprising a blade B, a handle H, composed of two members, one on either side of the blade, pieces P between the ends of said members and of the blades, the ends $b$ of said members and one side $p$ of said pieces being beveled, as shown, and the lower faces of said pieces being flush with the lower edge of the blade, substantially as set forth.

3. A try-square comprising a blade B, a handle H, composed of two members, one on either side of the blade, pieces P between the ends of said members, the ends $b$ of said members and one side $p$ of said pieces being beveled, as shown, and the lower faces of said pieces being flush with the lower edge of the blade, said members below the lower edge of said blade being spaced a distance equal to the thickness of two clapboards at their lapping edges, whereby said handle will retain a loose clapboard in place, as herein specified.

In testimony that I claim the foregoing as my own I have hereto affixed my signature in presence of two witnesses.

DANIEL HENRY ISEMINGER.

Witnesses:
SAIN WELTY,
JOHN A. STERLING.